United States Patent

Hall et al.

[11] Patent Number: 5,934,640
[45] Date of Patent: Aug. 10, 1999

[54] DEVICE FOR MOUNTING AND ADJUSTING A VIDEO-PHONE AND METHODS THEREOF

[76] Inventors: Tracy R. Hall, 647 Cambridge Dr., Santa Clara, Calif. 95051; Keith Barraclough, 610 Gilbert Ave #23, Menlo Park, Calif. 94025; Bryan R. Martin, 580 Sobrato Dr., Campbell, Calif. 95008

[21] Appl. No.: 08/796,909

[22] Filed: Feb. 6, 1997

[51] Int. Cl.⁶ ................................................. A47G 29/00
[52] U.S. Cl. ...................... 248/371; 248/349.1; 248/348; 248/373
[58] Field of Search .................................. 248/923, 398, 248/349.1, 918, 922, 921; 348/373

[56] References Cited

U.S. PATENT DOCUMENTS

| D. 276,612 | 12/1984 | McVicker et al. | D14/114 |
|---|---|---|---|
| D. 280,822 | 10/1985 | Judd et al. | D14/114 |
| D. 282,847 | 3/1986 | Hettinga | D14/114 |
| D. 305,330 | 1/1990 | Walters, Jr. et al. | D14/114 |
| D. 316,709 | 5/1991 | Howard et al. | D14/114 |
| 3,970,792 | 7/1976 | Benham et al. | 179/2 TV |
| 4,068,961 | 1/1978 | Ebner et al. | 403/55 |
| 4,494,720 | 1/1985 | Gregory et al. | 248/371 |
| 4,500,060 | 2/1985 | Anderson et al. | 248/349 |
| 4,562,988 | 1/1986 | Bumgardner | 248/349.1 |
| 4,575,033 | 3/1986 | Henneberg et al. | 248/185 |
| 4,645,153 | 2/1987 | Granzow et al. | 248/921 |
| 4,659,053 | 4/1987 | Holley et al. | 248/663 |
| 5,102,081 | 4/1992 | Barchus | 248/371 |
| 5,398,903 | 3/1995 | Cho | 248/349.1 |
| 5,734,414 | 3/1998 | Nishimura et al. | 348/14 |

FOREIGN PATENT DOCUMENTS 0461661  12/1991  United Kingdom ................... 248/371

OTHER PUBLICATIONS

Photocopy of a photo of Philips Phil–D000394A.
Photocopy of a photo of Connectix QuickCam.

*Primary Examiner*—Leslie A. Braun
*Assistant Examiner*—Kimbelry Wood

[57] ABSTRACT

A device for mounting a structure, such as a video-phone, includes a base and a platform. The base has a first surface for resting on top of a display device, for example, a television monitor or computer monitor. The base also has an opposite, platform-supporting surface which includes a first central recess and a second recess, or track, surrounding the first recess. The first and second recesses are separated by a ridged portion. The platform includes a top surface for engaging or being integral with the video-phone. The bottom surface engages the base and is contoured to slidably communicate with the first and second recesses. This allows the platform and the video-phone to move in a complete circle with respect to the base and to pivot to allow adjustment in the vertical direction. The mounting device prevents adjustment by tilting in a horizontal direction, and therefore prevents the transmission of strangely angled images.

17 Claims, 6 Drawing Sheets

DEVICE FOR MOUNTING AND ADJUSTING A VIDEO-PHONE AND METHODS THEREOF

FIELD OF THE INVENTION

The present invention relates generally to mounting devices. More particularly, the present invention relates to pedestals for mounting and adjusting a video-phone on a surface.

BACKGROUND OF THE INVENTION

In recent years, the technology for video-conferencing has advanced to a level where it has become practical for office and home use. Specifically, it is now available for the average consumer to be able to have equipment in the office and home which will permit the transmission of images to a person on the receiving end of a phone line. Likewise, the person on the receiving end of the line may transmit his image to the original caller. This type of technology often involves a video-phone. The video-phone includes a camera pointed at the person engaging in the conferencing, and his image is transmitted to a display, such as a television monitor at the other person's location. It is desirable that the video-phone be easily adjusted such that the person using the conferencing equipment may move around and then easily and conveniently adjust the video-phone to focus on him.

One type of device for allowing adjustment of a video-phone includes a ball and cup design. In these types of arrangements, the video-phone has a rounded, or ball-shaped, bottom. This ball-shaped bottom rests in a cup. However, these ball and cup designs have serious drawbacks. First, a video-phone with a ball-type mounting is unusable without a cup base to hold it. If the user ever misplaces the base, the video-phone just rolls away or adjusts to a strange angle. Second, the ball design allows the video-phone to roll or yaw. That is, the video-phone is allowed to tilt sideways which projects a crooked, and strange-looking image. Further, a ball and cup design is sometimes difficult for the user to position the ball within the cup. When the user is trying to mount the ball within the cup, it is sometimes difficult to do so because the user can't see the cup on the underside of the video-phone. The user sometimes has to feel for the cup, or look under the unit when first placing it on the cup.

Consequently, a need exists for a mounting device and method which overcome the aforementioned shortcomings of the prior art.

SUMMARY OF THE INVENTION

In one embodiment of the invention, a video-phone supporting apparatus for allowing adjustment of a view of a video-phone includes a base and a platform. The base includes a first surface and an opposite, platform-supporting surface. The platform-supporting surface includes first and second recesses and a ridged portion. The ridged portion separates the first recess from the second recess. The platform includes opposing top and bottom surfaces, and forward and back ends. The bottom surface is contoured to slidably communicate with the first and second recesses. This arrangement allows the platform to move substantially 360° with respect to the base and to pivot with respect to the base by movement of the forward and back ends. The top surface is constructed to support a video-phone.

In one aspect of the above implementation, the ridged portion at least partially circumscribes the first recess. The second recess at least partially circumscribes the ridged portion.

In another aspect, the first recess includes a spherically-shaped portion. The ridged portion surrounds the spherically-shaped portion, and the second recess includes a circular track. The circular track may surround the ridged portion.

In some applications, the base is substantially rectangular, and the first recess is substantially in a center of the rectangular base. The second recess surrounds the first recess and intersects with at least two sides of the rectangular base.

In one specific embodiment, the platform bottom surface includes a first rounded projection shaped to slidably move within the first recess. In some embodiments, the platform bottom surface further includes second and third rounded projections on opposite sides of the first rounded projection. The second and third rounded projections are shaped to slidably move within the second recess.

In another aspect, the invention is directed to an apparatus for mounting a video-phone on top of a display device. The apparatus includes a base and a platform. The base includes a resting surface adapted to rest upon the top of a display device, and a holding surface on an opposite side from the resting surface. The holding surface includes a track with inner and outer rims, and a hollowed portion in a region bordered by the inner rim. The platform includes a phone-mounting side and a base-engaging side. The phone-mounting side is integral with the video-phone, and the base-engaging side includes a plurality of contours adapted to slidably engage the track and the hollowed portion. This structure permits the video-phone to swivel and pivot about a first axis, while preventing pivoting about a second axis orthogonal to the first axis.

In one aspect of the above implementation, the hollowed portion includes a substantially spherically-shaped portion, and the track is circular and completely surrounds the spherically-shaped portion.

In one specific embodiment, the plurality of contours in the base-engaging side includes a first bulge to slidably engage the hollowed portion, and second and third bulges to slidably engage the track. In certain implementations of the embodiment, the second and third bulges are an opposite sides of the first bulge. The first, second, and third bulges include smooth, rounded surfaces.

In another aspect, the invention is directed to a method for mounting a video-phone on top of a display device. The method includes providing a base having a resting surface and a phone-holding surface with a track and a central recess. The base is placed on the top of the display device so that the resting surface engages the top of the display device. A video-phone is provided including a bottom, base-engaging surface with a bulged portion and a pair of wings. The track is used as a visual cue to align the pair of wings with the track. The video-phone is placed in the base by mounting the pair of wings within the track and the bulged portion within the central recess.

In one implementation, the method includes after placing the video-phone in the base, adjusting the video-phone by sliding the pair of wings in a circular path within the track to swivel the video-phone about a central, longitudinal axis.

In a further implementation, the method includes after placing the video-phone in the base, adjusting the video-phone by tilting the pair of wings within the track to tilt the video-phone about the central, longitudinal axis.

It is to be understood that both the foregoing general description and the following detailed description are exemplary only and are not restrictive of the invention, as claimed.

BRIEF DESCRIPTION OF THE DRAWINGS

Other aspects and advantages of the invention will become apparent upon reading the following detailed description and upon reference to the drawings in which.

Figure 1:
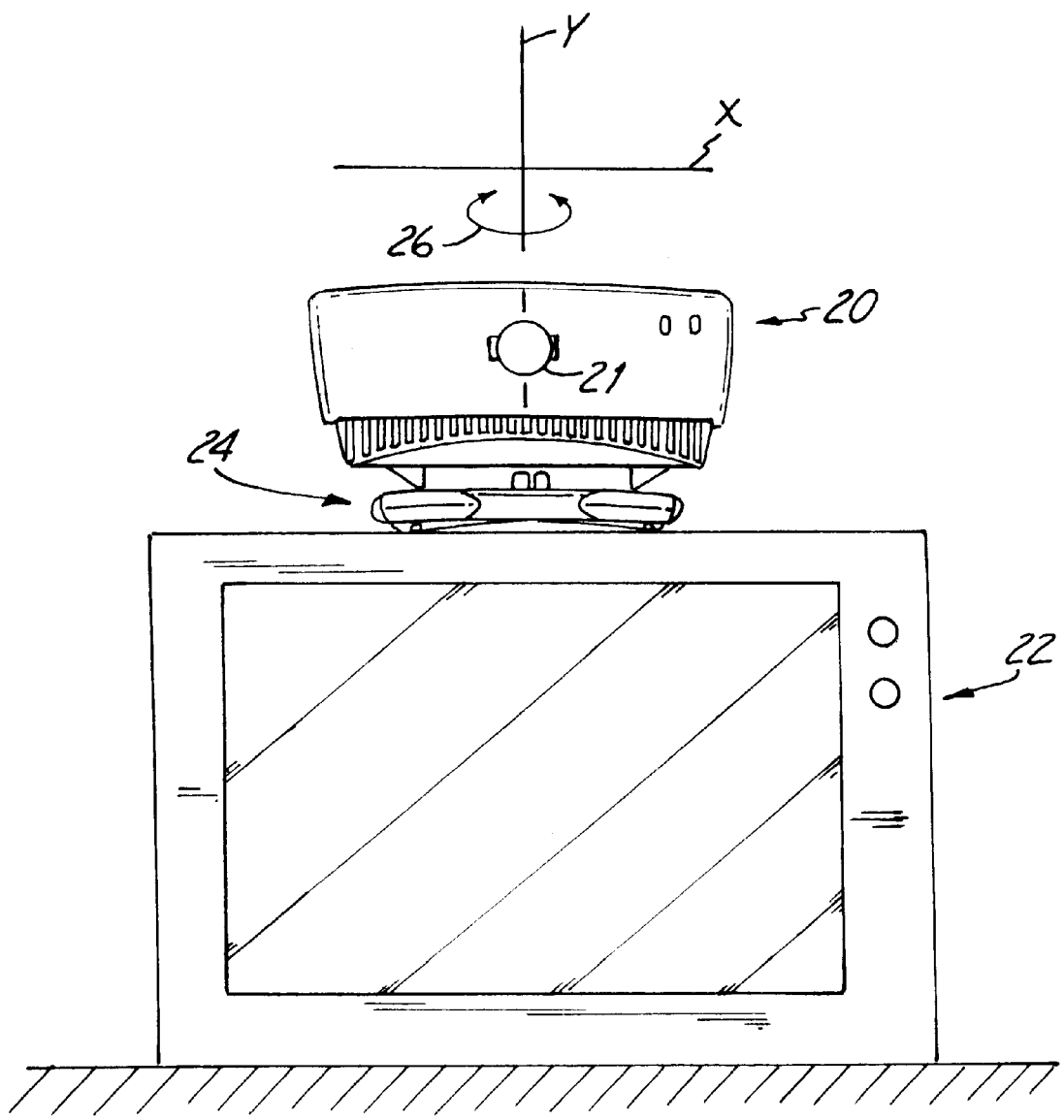
FIG. 1 is a front elevational view of a video-phone mounted on a television monitor, embodying principles of the present invention.

While the invention is susceptible to various modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DETAILED DESCRIPTION

One aspect of the present invention is directed to a video-phone supporting apparatus for allowing adjustment of a view of a video-phone. The apparatus includes a base for supporting a platform. The platform is contoured to slidably communicate with recesses in the base. Using the constructions consistent with the teachings herein, the cooperation between the contoured surface and the recesses advantageously results in an apparatus which easily allows a video-phone to move in a complete circle and to pivot forward and backward. However, it restricts movement from side to side. This is advantageous because, for example, the side to side movement transmits strangely angled pictures. Further, the apparatus is easily adjustable to any position, yet stable once left alone. In addition, because in some implementations one of the recesses is a circular track, it provides not only a mechanical guide for the contoured surface of the platform in order to adjust the structure being mounted, but it also provides a visual cue to the user. This allows for easier initial placing and positioning of the platform onto the base.

FIG. 1 illustrates one example embodiment of the present invention. A video-phone 20 for video conferencing is mounted on top of a display device 22, such as a television or computer monitor. The video-phone 20 includes the appropriate circuitry and electronics to enable transmission of the user's image across transmission means to the other user of the conferencing equipment. The other user's image is projected onto TV monitor 22. The video-phone 20 is mounted on a TV monitor 22 by a mounting device 24. Mounting device 24, to be described in more detail below, permits video-phone 20 to swivel in a direction shown at 26 about a central longitudinal axis, i.e., the Y axis. The swivel action allows video-phone 20 to pan from side to side. Mounting device 24 also allows video-phone 20 to tilt along the Y axis, i.e. from front to back of the video-phone. That is, mounting device 24 allows a lens 21 of video-phone 20 to move up and down as shown in the orientation in FIG. 1. The tilting of the video-phone from front to back allows for a vertical adjustment of the image. The design of mounting device 24 prevents tilting from side-to-side along the X axis. This prevents the transmission of images at strange angles. Tilting from side-to-side along the X axis is also referred to herein as a "yaw."

Mounting device 24 includes a base and a platform. One example of a base is illustrated in FIGS. 2–9 at 28. In the particular embodiment shown, base 28 is substantially rectangular in shape (FIGS. 2, 3, and 6) and provides a pivot surface for video-phone 20 and the platform to move about. Base 28 is generally a thin, rectangular piece with two major surfaces, bordered by four sides. A first major surface includes a resting surface 30, illustrated in FIG. 3. Resting surface 30 includes a flat portion 32 along two opposite ends 34, 36. Flat portion 32 provides a level resting surface to engage the top of television monitor 22. The second major surface includes a platform-supporting surface 38 to provide a surface which the platform and the video-phone may rest upon. This construction leads to advantages. For example, it has been found that in video conferencing, it is useful to maintain vertical proximity between the camera and the display device. This is because while the user is watching the display device, his image is simultaneously being transmitted by the camera to the other party. It is more appealing to have the user's image appear to be looking into the camera rather than in another direction. One way to accomplish this is through vertical proximity. The illustrated embodiment achieves this due to its thin, flat shape. The thinness allows for the user to stare at the display while still be within the field of view of the camera and appear to be staring at the camera.

Figure 3:
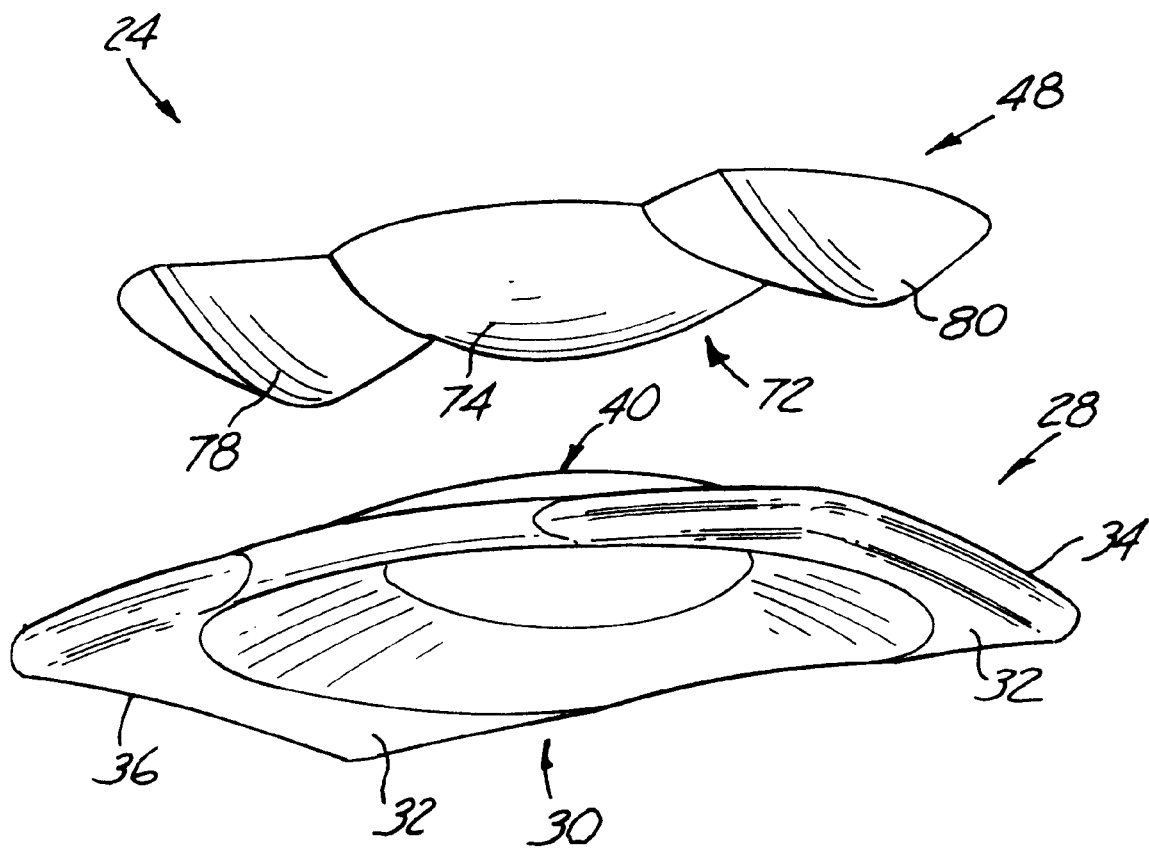
FIG. 3 is an exploded bottom perspective view of the mounting device of FIG. 2, embodying principles of the present invention.
Figure 7:
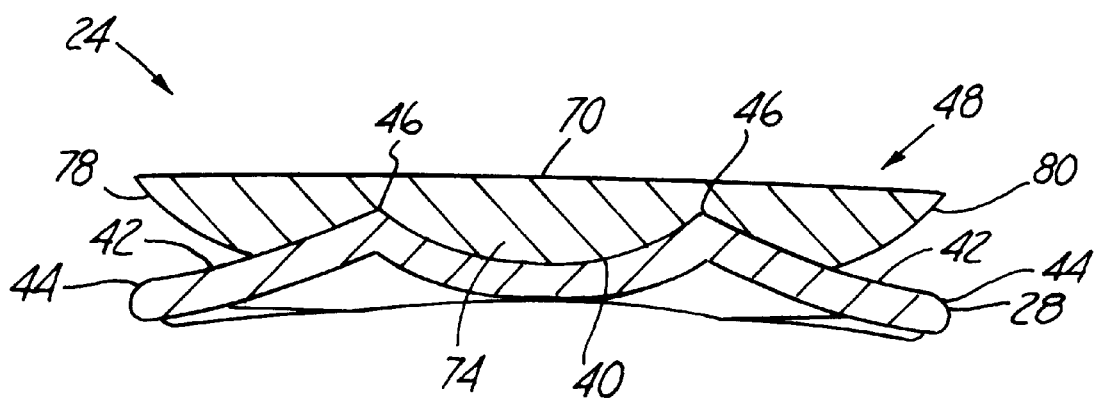
FIG. 7 is a cross-sectional view along the line VII—VII of FIG. 6, embodying principles of the present invention.
Figure 8:
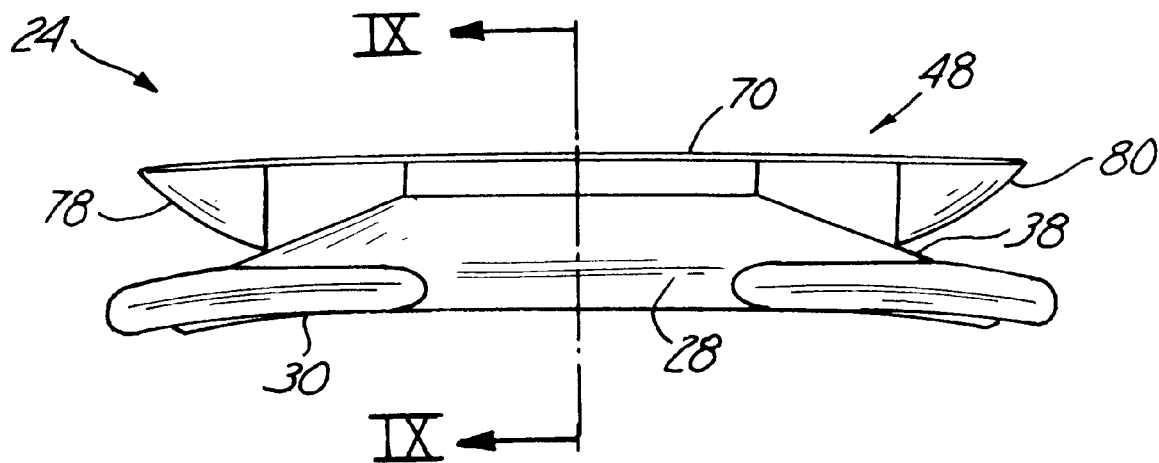
FIG. 8 is a front elevational view of the mounting device of FIG. 2, embodying principles of the present invention.
Figure 9:
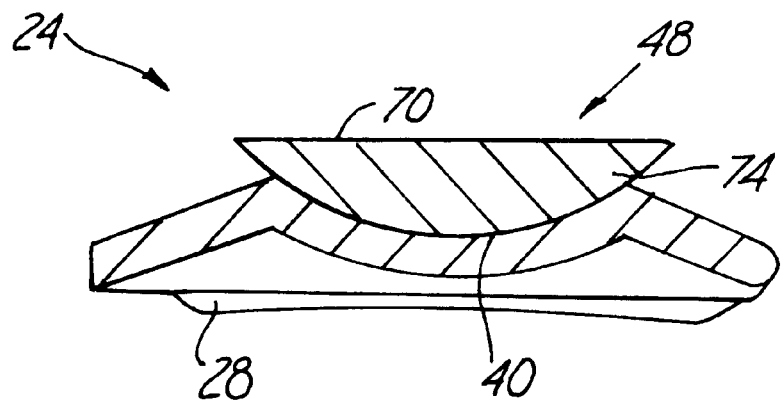
FIG. 9 is a cross-sectional view along the line IX—IX of FIG. 8, embodying principles of the present invention.

Platform-supporting surface 38 includes first and second recesses separated by a ridge. The first and second recesses provide mechanical guides for the platform and video-phone to engage and move within in order to adjust the video-phone. In the specific embodiment illustrated, the first recess is shown in FIG. 3 at 40 in a generally central portion of base 28. In the specific implementation illustrated in cross-section in FIGS. 7 and 9, first recess 40 is a hollowed-out portion, such as the shape of a portion of a sphere. It is generally smooth so as to enable smooth movement between base 28 and the platform. A second recess 42 surrounds the first recess 40 and is bordered by an outside rim 44 and an inside rim 46 (FIG. 7). Inside rim 46 acts as a ridge to separate first recess 40 from second recess 42 and helps to prevent side-to-side movement, or yaws, of video-phone 20. Second recess 42 acts as a track, or mechanical guide, for the platform to move within. Second recess 42 guides the platform and the video-phone 20 to allow the video-phone 20 to swivel in the direction 26. Second recess 42 also is a visual cue to the user, so that when the user is mounting the platform and video-phone onto base 28, he is able to more easily align the two pieces. One reason for this is because, for example, the second recess 42 provides a visual cue at the outermost periphery of the base, which minimizes the visual angle necessary to align the platform and the base.

One preferred material for base 28 includes, at least in part, a rubberized plastic. This type of material provides enhanced friction such that once a position for the platform and video-phone is selected, it will not easily move out of place without an external force disturbing it.

Figure 2:
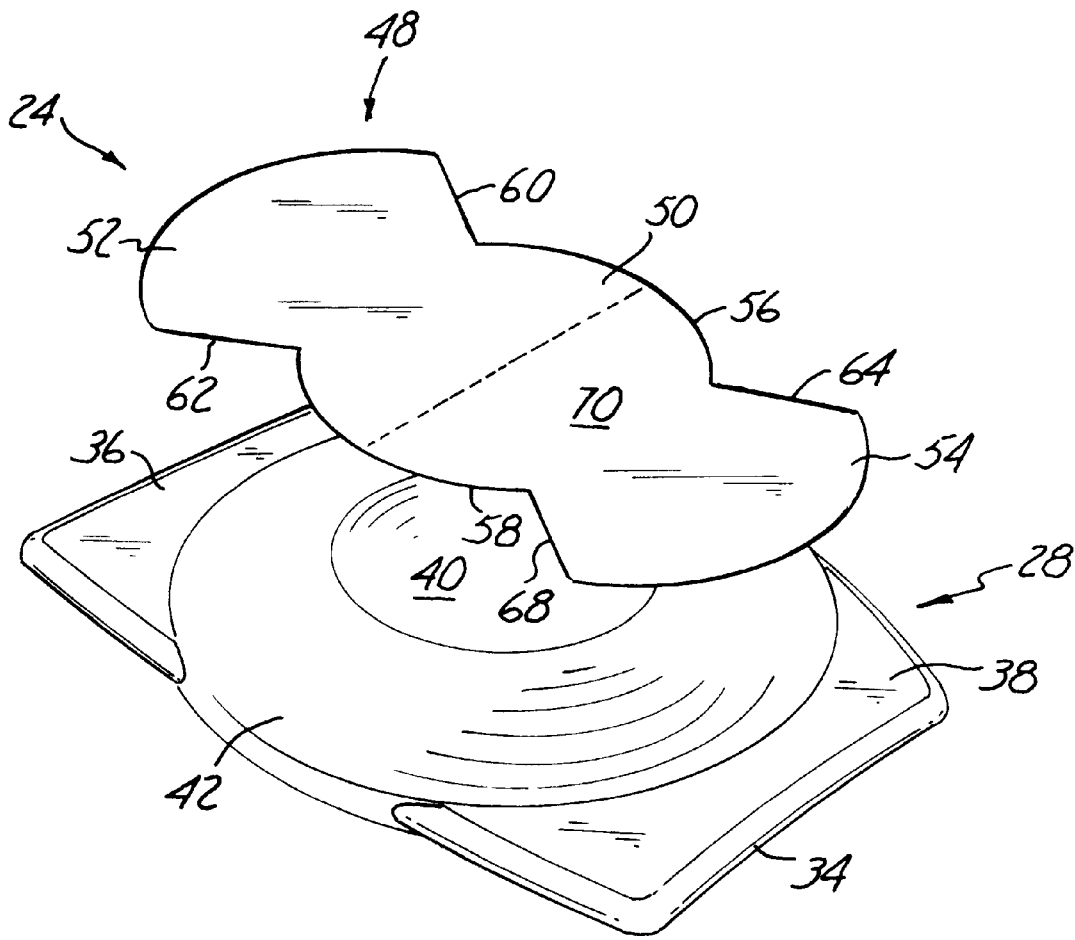
FIG. 2 is an exploded top perspective view of a mounting device, embodying principles of the present invention.

One example of a platform for mounting video-phone 20 onto base 28 is illustrated generally at 48. Referring first to FIG. 2, platform 48 includes a central portion 50 and a pair of wings 52, 54 at opposite ends of the central portion 50. Central portion 50 has a pair of rounded edges 56, 58, adjacent forward and back ends. The wings 52, 54 extend angularly at angled edges 60, 62, 64, 66 from rounded edges 56, 58. Platform 48 includes a structure-supporting surface 70, and a base-engaging surface 72. In one implementation illustrated in FIG. 1, structure-supporting surface 70 is integral with video-phone 20. That is, when video-phone 20 is manufactured, the video-phone housing is molded with a platform 48 as one unitary structure. In other implementations, platform 48 is attached mechanically to whatever structure it is supporting, by, for example, bolts or welds.

Figure 4:
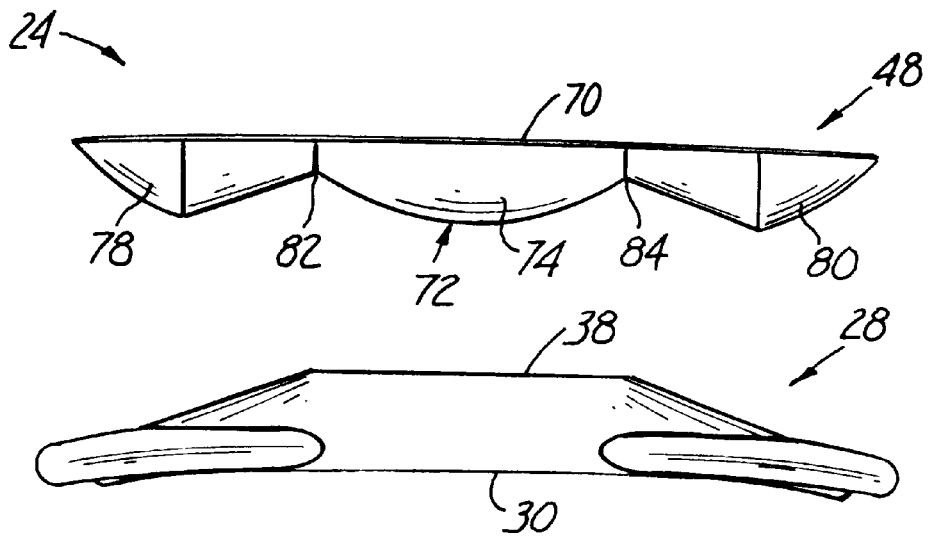
FIG. 4 is an exploded front elevational view of the mounting device of FIG. 2, embodying principles of the present invention.
Figure 5:
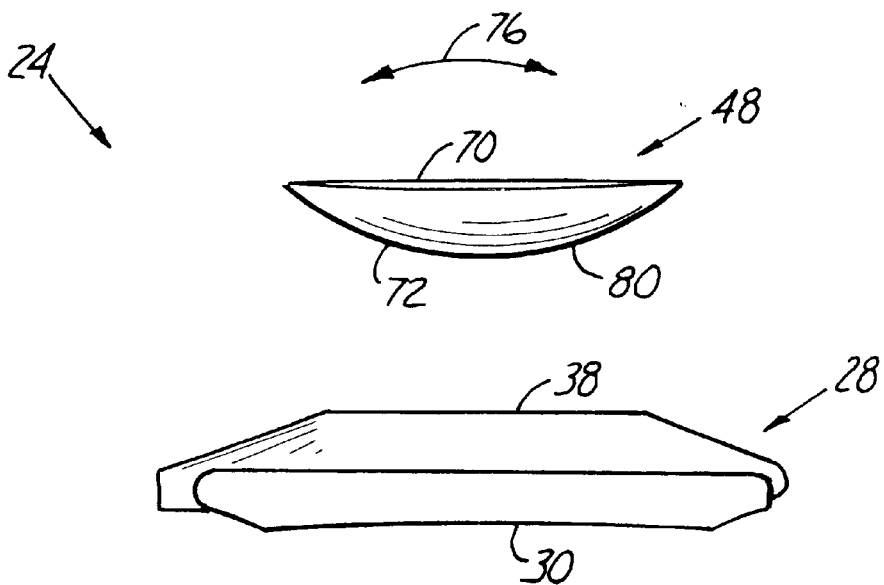
FIG. 5 is an exploded side elevational view of the mounting device of FIG. 2, embodying principles of the present invention.

The base engaging surface 72 is contoured in a way to slidably communicate with the base and allow the video-phone to swivel and to tilt along a vertical direction, while preventing tilting along a horizontal direction. As illustrated in FIGS. 3 and 4, base engaging surface 72 includes a first rounded projection 74 or bulge in the region of central portion 50. First rounded projection 74 slidably engages first recess 40 of base 28 to allow platform 48 to swivel about the Y axis, and to allow platform 48 to move in the direction 76 (FIG. 5). That is, platform 48 is allowed to tilt by movement in a vertical direction of its forward and back ends.

Figure 6:
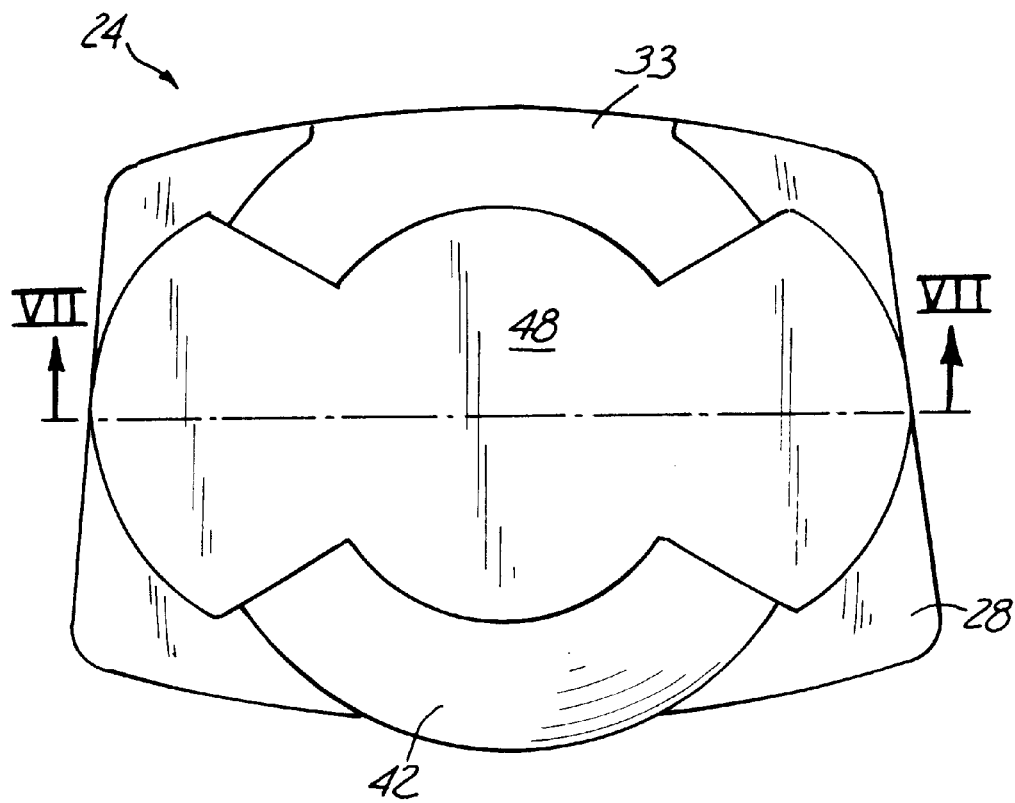
FIG. 6 is a top plan view of the mounting device of FIG. 2, embodying principles of the present invention.

Base engaging surface 72 also includes a second and third rounded projection 78, 80 on opposite sides of first rounded projection 74 (FIGS. 3 and 4). Second and third rounded projections 78, 80, in the illustrated embodiment, are in the wings 52, 54 of platform 48. Second and third rounded projections 78, 80 slidably engage second recess 42 of base 28 (FIGS. 6 and 7). By moving with respect to second recess 42, second and third rounded projections 78, 80 allow platform 48 and video-phone 20 to move in the direction 26, i.e., swivel about the Y axis. Second and third rounded projections 78, 80 are separated from first rounded projection 74 at dips 82, 84 (FIG. 4). Dips 82, 84 engage inside rim 46 when platform 48 is mounted onto base 28. It is through the cooperation of second and third rounded projections 78, 80 and dips 82, 84 engaging inside rim 46 that prevents platform 48 from tilting side to side, i.e., tilting along the X axis.

In one implementation, platform 48 is made from a molded plastic. When platform 48 engages base 28, the user is allowed to adjust the platform by moving the second and third rounded projections 78, 80 within the second recess 42 in order to pan the video-phone 20. This also allows the video-phone to swivel in a complete 360° circle with respect to the base 28. Further, the user is allowed to tilt the video-phone vertically in a direction along the Y axis at any point along that 360° circle. This allows for height adjustments. The user is prevented from tilting the video-phone 20 from side-to-side. This prevents the video-phone from yawing.

Because of the design of platform 48, the structure attached to the platform, in the example illustrated, a video-phone, is usable without the base 28. The design of the three projections provides stability to the video-phone, even without a supporting base. This is not the case with ball and cup designs. For example, in ball and cup designs, if the cup is missing, the video-phone will roll away on its ball.

One method for mounting a video-phone on top of a display device, such as a television monitor, is as follows: a base is provided having a resting surface and a video-phone-holding surface with a track and a central recess. One example of a base usable is a base as illustrated at 28 in the figures. The base is placed on top of a display device, or television monitor, so that the resting surface engages the top of the display device.

A video-phone including a bottom, base-engaging surface with a bulged portion and a pair of wings is provided. One example of the type of bottom, base-engaging surface is illustrated in the figures at 72. The user then visually uses the track 42 of the base as a visual cue in order to help properly position the video-phone 20 into the base. For example, in certain applications, the video-phone may be so large that it obstructs the view of the person mounting the video-phone from seeing the bottom, base-engaging surface. In that case, the track 42 acts as a large visual target area to align the pair of wings 52, 54 into the track 42. The video-phone 20 is then placed in the base 28 by placing the pair of wings 52, 54 within the track 42 and the bulged portion 74 within the central recess 40. After placing the video-phone in the base 28, the video-phone 20 may be adjusted to pan the room by sliding the pair of wings 52, 54 in a circular path within the track 42. This swivels the video-phone 20 about a central longitudinal axis of the video-phone 20. In addition, the video-phone 20 is adjusted by tilting the pair of wings 52, 54 within the track 42 to move the video-phone 20 along the central, longitudinal axis, the Y-axis as shown in FIG. 1. This allows the video-phone 20 to adjust its image in a vertical direction. The user is prevented from adjusting the video-phone 20 by tilting it in a horizontal direction, thereby preventing the transmission of strangely angled pictures.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A video-phone supporting apparatus for allowing adjustment of a view of a video-phone, comprising:

a base including a first surface and an opposite, platform-supporting surface; the platform-supporting surface including first and second recesses and a ridged portion; the ridged portion separating the first recess from the second recess; and a platform including opposing top and bottom surfaces, forward and back ends; the bottom surface including a first rounded projection being contoured to slidably communicate within the first recess and including second and third rounded projections on opposite ends of the first rounded projection, the second and third rounded projections being shaped to slidably move within the second recess and the bottom surface configured to allow the platform to pivot with respect to the base by movement of the forward and back ends; and the top surface being constructed to support a video-phone.

2. An apparatus, according to claim 1, wherein the ridged portion at least partially circumscribes the first recess.

3. An apparatus, according to claim 2, wherein the second recess at least partially circumscribes the ridged portion.

4. An apparatus, according to claim 1, wherein the first recess includes a spherically-shaped hollowed portion.

5. An apparatus, according to claim 4, wherein the ridged portion surrounds the spherically-shaped hollowed portion.

6. An apparatus, according to claim 5, wherein the second recess includes a circular track.

7. An apparatus, according to claim 6, wherein the circular track surrounds the ridged portion.

8. An apparatus, according to claim 1, wherein the base is substantially rectangular, the first recess is substantially in a center of the rectangular base, and the second recess surrounds the first recess and intersects with at least two sides of the rectangular base.

9. An apparatus, according to claim 1, wherein the first recess includes a spherically-shaped hollowed portion, and the second recess includes a circular track surrounding the spherically-shaped hollowed portion.

10. An apparatus, according to claim 9, wherein the first rounded projection rests within the spherically-shaped hollowed portion, and the second and third projections rest within the circular track.

11. An apparatus for mounting a video-phone on a top of a display device, the apparatus comprising:
   a base including a resting surface adapted to rest upon the top of the display device, and a holding surface on an opposite side from the resting surface; the holding surface including a track with inner and outer rims, and a hollowed portion in a region bordered by the inner rim and the inner rim including a ridge area; and
   a platform including a video-phone mounting side and a base-engaging side; the video-phone mounting side being configured and arranged to support the video-phone, and the base-engaging side including a plurality of contours adapted to slidably engage the track and the hollowed portion to permit the video-phone to swivel about and tilt along a first axis, while preventing tilting about a second axis orthogonal to the first axis, wherein the plurality of contours includes a first bulge to slidably engage the hollowed portion, and second and third bulges to slidably engage the track.

12. An apparatus, according to claim 11, wherein the hollowed portion includes a substantially spherically-shaped portion, and the track is circular and completely surrounds the spherically-shaped portion.

13. An apparatus, according to claim 1, wherein the second and third bulges are on opposite ends of the first bulge.

14. An apparatus, according to claim 1, wherein the first, second, and third bulges include smooth, rounded surfaces.

15. A method for mounting a video-phone on a top of a display device, comprising the steps of:
   providing a base having a resting surface and a video-phone holding surface; the video-phone holding surface including a track and a central recess;
   placing the base on the top of the television monitor so that the resting surface engages the top of the display device;
   providing a video-phone including a nonmovable camera, and a base-engaging surface having a bulged portion and a pair of oppositely-arranged projections on opposing sides of the bulged portion, the bulged portion and the projections projecting toward the base;
   moving the video-phone in the base with the projections aligned in the track and the bulged portion within the central recess.

16. A method, according to claim 15, further including:
   adjusting the video-phone by sliding the projections in a circular path along the track to swivel the video-phone about a central axis.

17. A method, according to claim 15, further including:
   adjusting the video-phone by tilting the projections along the track to tilt the video-phone about a central axis.

* * * * *

UNITED STATES PATENT AND TRADEMARK OFFICE
CERTIFICATE OF CORRECTION

PATENT NO. : 5,934,640

DATED : August 10, 1999

INVENTOR(S) : HALL et al.

It is certified that an error appears in the above-identified patent and that said Letters Patent is hereby corrected as shown below:

Col. 2, line 41: "an" should read --on--.

Signed and Sealed this

Twenty-fourth Day of October, 2000

Attest:

Q. TODD DICKINSON

*Attesting Officer*   *Director of Patents and Trademarks*